United States Patent

[11] 3,554,218

[72] Inventor John J. Smith
 Decatur, Ill.
[21] Appl. No. 816,230
[22] Filed Apr. 15, 1969
[45] Patented Jan. 12, 1971
[73] Assignee Mueller Co.
 Decatur, Ill.
 a corporation of Illinois

[54] TAMPER-PROOF ROTARY PLUG VALVE
 9 Claims, 5 Drawing Figs.
[52] U.S. Cl. ................................................ 137/385,
 70/176
[51] Int. Cl. ..................................................... E05b 67/36,
 E05b 19/00, F16k 35/00
[50] Field of Search .......................................... 137/383,
 385; 70/14, 34, 395, 163, 164, 172, 173, 178, 176

[56] References Cited
 UNITED STATES PATENTS
 359,714  3/1887  Deming .................... 70/176
 1,325,189 12/1919  Carter ..................... 70/176
 1,472,816 11/1923  Smith ...................... 137/385

Primary Examiner—Henry T. Klinksiek
Attorney—Cushman, Darby and Cushman

ABSTRACT: A rotary plug valve capable of being locked in a selected position by an elongated plunger-type lock member, the elongated plunger-type lock member, when in the locking position, being completely isolated from engagement by hammers, saws or the like used in an attempt to destroy the lock member for unauthorized opening of the rotary plug valve. The rotary plug valve also has the operating means for the valve plug member which may be removed and replaced by a closure plug, thereby eliminating the chance of damage to the valve plug member if an unauthorized attempt is made to operate the same. Preferably, the rotary plug valve, when used as a gas meter stop, is arranged to be locked in its closed position and when so locked, only authorized personnel with a nonstandard key means can reopen the rotary plug valve.

PATENTED JAN 12 1971
3,554,218
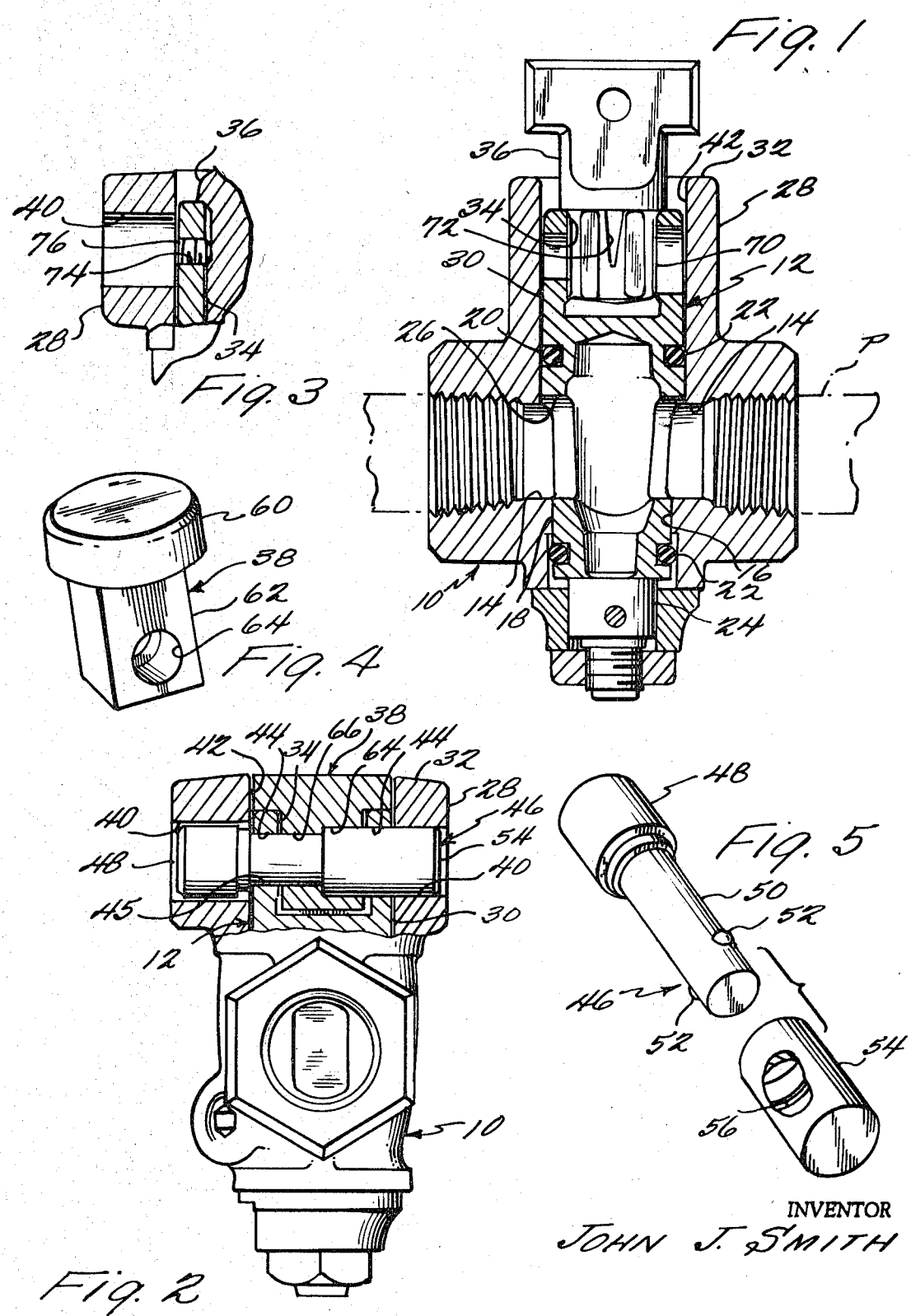
INVENTOR
JOHN J. SMITH
BY Cushman, Darby & Cushman
ATTORNEYS

TAMPER-PROOF ROTARY PLUG VALVE

The present invention relates to an improvement in rotary plug valves of the tamper-proof type and, more particularly, to a gas meter stop or valve which may be locked in a selected position, preferably the closed position.

Situations often occur where it is necessary for the gas company to turn off the gas for an entire house. This situation could occur when a customer is delinquent in his account with the gas company or it could occur when service must be interrupted for the making of repairs or adjustments or for the installation of new gas appliances. In either situation where it is necessary for the gas company personnel to leave the dwelling for any period of time and the gas meter stop must be closed, the gas meter stop must be tamper-proof to prevent the customer from turning on the gas to the house. In a situation where the customer is delinquent in his account, it is obvious that the gas company wants the gas to remain off so that the company will not sustain further loss of income until the account is settled. In other situations where maintenance is being provided, the pilot lights of the appliances will be off and an inexperienced householder may forget to light the same, causing leakage, which may result in explosion or other disastrous situations.

Accordingly, it is an object of the present invention to provide a rotary plug valve which may be locked in a selected position, the plug valve being tamper-proof when in this position, in such a manner that the use of hammers, saws or the like cannot be applied to the lock to release the same.

A further object of the present invention is to provide an improved rotary plug valve which, when locked in a selected position, has the valve plug member completely protected from the application of any tools to the same if an effort is made to turn the valve plug member.

Still another object of the present invention is to provide an improved tamper-proof rotary plug valve utilizing a removable operating head or handle member adapted to be fixedly retained in a socket provided in the end of the valve plug member, the end of the valve plug member not extending beyond the exterior of the valve body member.

To accomplish the above objects and advantages, the rotary plug valve of the present invention is provided with a body member having a passage therethrough intersected by a plug seat, a ported valve plug member rotatable in the plug seat between an open position and a closed position, the valve plug member having an end portion which terminates flush with or below the exterior of the valve body member. The end portion of the valve plug member is provided with an axially extending noncircular socket for receiving an operating head handle member having a complementary noncircular end portion. Additionally, the valve body member is provided with a skirtlike extension which surrounds the open end of the plug seat, as well as the end portion of the valve plug member. Suitable bores are provided in the plug member and in the skirtlike extension which are arranged to be aligned in a selected position, preferably the closed position, and into which an elongated plunger-type lock member may be inserted and locked, the handle member having been previously removed. Additionally, the closure plug is adapted to fit into the socket in the end portion of the valve plug member so as to protect the end portion of the valve plug member when the rotary plug valve is locked, the closure member having a bore therethrough arranged to be aligned with the bores in the skirtlike extension of valve body member and the end portion of the valve plug member so that the closure plug is retained in position by the lock member.

These and other objects and advantages of the present invention will be more apparent from the following specification, claims and drawings, in which:

FIG. 1 is a vertical, sectional view of the rotary plug valve of the present invention, the valve being shown in its open position with its operating head or handle member fixedly retained on the valve plug;

FIG. 2 is an end elevational view of the valve of FIG. 1, the view being partly in section and illustrating the valve in the closed position with the operating head removed and replaced by a closure plug and with the valve plug member locked in the closed position;

FIG. 3 is a fragmentary, sectional view of a portion of the rotary plug valve and illustrating the means for fixedly retaining the operating head or handle member in the socket valve plug member;

FIG. 4 is a perspective view of the closure plug utilized to replace the operating head when the rotary plug valve is locked; and FIG. 5 is a perspective view of a typical plunger-type lock utilized with the rotary plug valve of the present invention.

Referring now to the drawings, wherein like character or reference numerals represent like or similar parts, the rotary plug valve of the present invention comprises a valve body member or casing generally designated at 10, and a valve plug member or key generally designated at 12. The valve body member 10 has a flow passage extending therethrough constituted by the ports or openings 14, the outer ends of which are threaded, as is usual for connections with other parts of the system being controlled, such as the ends P of sections of pipe line (shown in broken lines). Of course, other means of connection may be employed, such as flange connections or the like.

Extending laterally through the valve body member 10 is a valve plug seat 16 open at least at one end for reception of the valve plug member 12. The seat may be tapered at least in a major or principal portion thereof. The valve plug member 12 includes a major portion which is exteriorly tapered as at 18 to be received in the tapered portion of the plug seat 16 of the body member 10. Circumferential grooves 20 are provided at either end of the tapered portion 18 of valve plug member 12, the grooves 20 receiving O-ring seals 22 for providing a further seal against leakage, in addition to the seating surfaces of the tapered portions 16 and 18.

Outwardly of the lower circumferential groove 20, the valve plug member 12 is provided with a reduced valve stem 24, the valve stem 24 being utilized to secure the valve plug member 12 in the valve body member 10 by any suitable means, such as, for example, those described in U.S. Pat. No. 2,653,791, issued Sept. 29, 1953 to Frank H. Mueller. The valve plug member 12 is further provided with a passageway or port 26 extending therethrough, the passageway or port 26 being complementary in shape and size to the flow passage or port openings 14 of the valve body member 10. By rotation of the valve plug member 12, on its axis through an arc of substantially 90°the flow passageway 26 can be brought into and out of alignment with the passage 14 of the valve body member 10 to respectively open and close the rotary plug valve.

As clearly shown in FIGS. 1 and 4, the valve body member 10 is provided with an annular skirtlike extension 28 circumscribing the upper open end of the valve plug seat 16 and defining an extension of the same. The valve plug member 12 is provided with an end portion 30, which extends upwardly within the skirtlike extension 28, but terminates flush with or beneath the outer edge 32 of the same. The end portion 30 of valve plug member 12 is provided with an axially extending noncircular socket 34, which is preferably square or rectangular in cross section. The socket 34 is arranged to receive either a T-shaped operating head or handle member 36 or a closure plug 38, as will be explained in more detail later in the specification.

Referring to FIG. 2, in which the rotary plug valve is shown in the closed position and locked, it will be noted that the skirtlike extension 28 is provided with a bore 40 therethrough transverse of the axis of the valve plug seat 16, which intersects the axial bore 42, the bore 42 being in effect an extension of the plug seat. The end portion 30 of the valve plug member 12 is provided with a bore 44 therethrough, the bore 44 intersecting the axially extending socket 34. As will be noted, the bore 44 has a reduced portion 45, the purpose of which will be explained later in the specification. When the rotary plug valve is in the closed position, the bores 40 and 44 are in axial alignment and provide a means for receiving elongated plunger-type lock member 46.

Referring to FIG. 5, there is disclosed a conventional elongated plunger-type lock member 16, such as shown in the U.S. Pat. Nos. 3,002,368 and 3,186,196, issued respectively on Oct. 3, 1961 and Jun. 1, 1965 to S. M. Moberg. The plunger-type lock member 16 for the purpose of this description includes a first enlarged head 48 having a reduced shank 50, the shank 50 carrying a pair of steel balls 52 held in an outward position by a plunger (not shown) reciprocal within the reduced shank 50. A second separate enlarged cup-shaped head 54 is provided, the cup-shaped head being arranged to receive the reduced shank 50 and having an annular groove 56 on the interior thereof which is arranged to receive the balls 52 when the plunger (not shown) is in a position within the shank 50 to prevent the balls from moving radially inwardly. This locks the two elements of the plunger-type lock member together until such time that a key means (not shown), such as disclosed in either of the aforementioned U.S. Pat. Nos. 3,002,368 or 3,186,196 is inserted axially through one of the heads to move the plunger from between the balls. Of course, a keymeans such as shown in U.S. Pat. No. 3,033,016, issued May 8, 1962 to S. M. Moberg may be used.

Referring back to FIG. 2, it will be noted that the plunger-type lock member 46 is shown inserted through the bores 40 and 44. Since no portion of the elongated plunger-type lock member 46 should extend beyond the exterior of the sleevelike extension, the overall length of the bore 40 must be at least as great as the overall length of the lock member 46 when the two elements of the lock member are in locked position. It will now be obvious that at least a portion of the bore 44 must be reduced so that the head 48 and the head 54 are arranged to engage a portion of the valve plug member to prevent the plunger-type lock member from being moved axially when in the locked position.

In FIG. 4 the closure plug 38 is disclosed and it will be noted that this plug is provided with a head 60 and an end portion 62, which is noncircular in cross section and which is complementary to the noncircular socket 34. In the end portion 62, the closure plug 38 is provided with a bore 64 extending therethrough, the bore 64 having a reduced portion 66. When it is desired to lock the rotary plug valve in the closed position, and prior to actual insertion of the elements of the plunger-type lock 46 into the bores 40 and 44 from opposite directions, the closure plug 38 is inserted in the socket with its bore 64 axially aligned to the bores 40 and 44. The separate parts of the lock may then be inserted and locked in position as shown in FIG. 2 and it will be noted that the closure plug 38 is flush with the top or end 32 of the sleevelike extension and thus completely protects the valve plug member 12. In FIG. 2, it will be further noted that the bore 64 has a reduced portion and also that the bore 44 has the reduced portion 45 which are adjacent one another and receive the shank 50. The purpose of having at least a portion of the bores 44 and 64 of greater diameter than the shank 50 and at least sufficient to receive the cup-shaped head 54 is because the length of the head is such that it is greater than the wall thickness of the skirtlike extension 28. Of course, it will be appreciated that the cup-shaped head portion 54 does not necessarily have to have such an axial length as shown, this merely being a conventional type of sleeve-type lock member. If the head portion 54 was of less axial length so that it did not extend into the bore 44 of the valve plug member 12 and the bore 64 of the closure plug 38, then the bores in these respective elements could be made merely sufficient to accommodate the shank 50 which would then extend all the way through the same.

Referring now to FIGS. 1 and 3, it will be noted that the operating head or handle member 36 is provided with an end portion 70, which is noncircular in cross section and complementary to the socket 34 and a flat T-shaped portion 71 for receiving a wrench to turn the valve plug member 12. The end portion 70 is provided on its surface with at least one groove 72, which extends downwardly for a portion of its axial length. The end portion 30 of the valve plug member 12 is provided with a tapped or threaded hole 74 intermediate the ends of the bore 44, the tapped or threaded hole 74 extending through the wall and opening to the socket 34. When the rotary plug valve is closed, it is necessary to insert the operating handle 36 into the socket, then turn the valve plug member 12 to the open position, and this brings the hole 74 therein into alignment with the bore 40 in the skirtlike extension 28. Access may then be had to the set screw and it can be threaded inwardly so that its end is received in the groove 72 and thus it retains the operating head or handle member 36 against axial movement. The valve can then be turned on and off as desired. When it is desired to lock the valve, the set screw or retaining screw 76 must be removed while the valve is in the open position, the handle member 36 then being utilized to turn the valve to the closed position. The handle is then axially removed from the end of the valve plug member 12 and the closure plug 38 inserted with the elongated plunger type lock 46 being subsequently applied to the aligned bores as previously described.

The terminology used throughout the specification is for the purpose of description and not limitation, the scope of the invention being defined in the claims.

I claim:

1. A tamper-proof rotary plug valve capable of being locked in a selected position by an elongated plunger-type lock member having a first enlarged head on a reduced shank and a second separate enlarged cup-shaped head arranged to receive and be locked to the shank and released from the shank by key means axially inserted into the shank, said rotary plug valve comprising a body member having a plug seat and provided with a flow passageway therethrough intercepted by the plug seat, a skirtlike extension on said body member and surrounding an open end of said plug seat, said skirtlike extension having a bore therethrough transverse to the axis of the plug seat and of a diameter to receive the heads of the plunger-type lock member, said bore in said skirtlike extension having a length at least as great as the length of the plunger-type lock member whereby the heads of said plunger-type lock member do not extend beyond the exterior of said skirtlike extension, a plug member having a flow passage therethrough, said plug member being rotatable in said plug seat between an open position in which its flow passage is in registration with the flow passageway in said body member and a closed position, said plug member having an end portion extending into the skirtlike extension and terminating no greater than flush with the outer end of said skirtlike extension, a noncircular socket in the end portion of said plug member for reception of a device to rotate said plug member, said plug member having a transverse bore in its end portion intersecting said socket and arranged to be aligned with the bore in said skirtlike extension when the plug member is in the selected position for locking, said bore in said plug member having at least a portion thereof with a diameter less than the diameter of the heads of said plunger-type lock member, but sufficient to receive the shank of the same.

2. A tamper-proof rotary plug valve as claimed in claim 1, including a handle member removably supported by said plug member, said handle member having a noncircular end portion complementary in shape to said socket in the end portion in said plug member for reception therein.

3. A tamper-proof rotary plug valve as claimed in claim 2, including means to fixedly retain said handle member against axial movement relative to said plug member.

4. A tamper-proof rotary plug valve as claimed in claim 3, in which said last mentioned means includes a set screw threadedly received in a threaded bore provided in the end portion of said plug member, said set screw engaging the noncircular end portion of said handle and said set screw being accessible through the transverse bore in said skirtlike extension.

5. A tamper-proof rotary plug valve as claimed in claim 1, in which said end portion of said plug member terminates at a predetermined distance below the end portion of said skirtlike extension and including a closure plug having an enlarged head portion and a reduced end portion of noncircular cross section complementary to the socket in said plug member, said head portion being received in said skirtlike extension and lying substantially flush with the end of the same when the end portion of said closure plug is inserted into said socket, said end portion of said closure plug having a bore therethrough arranged to be aligned with the bore in the end portion of said plug member for reception of a portion of the plunger type lock member.

6. A tamper-proof rotary plug valve as claimed in claim 1 in which said bore in the end portion of said plug member is arranged to align with said bore in said sleevelike extension when said valve is in said closed position.

7. In combination: an elongated plunger type lock member comprising a first enlarged head, a reduced shank integral with said head, and a second enlarged cup-shaped head arranged to receive and be locked to the shank and released from the shank by key means axially inserted into the shank, and a tamper-proof rotary plug valve comprising a body member having a plug seat and provided with a flow passage therethrough intersected by the seat, an annular skirtlike extension on said body member and surrounding an open end of said plug seat, said skirtlike extension having a bore therethrough transverse to the axis of the plug seat and of a diameter to receive the heads of the plunger-type lock member, said bore in said skirtlike extension having a length at least as great as the length of the plunger-type lock member whereby the heads of said plunger-type lock member do not extend beyond the exterior of the skirtlike extension, a plug member having a flow passage therethrough, said plug member being rotatable in said plug seat between an open position and a closed position for said valve, said plug member having an end portion extending into said skirtlike extension and terminating no greater than flush with the outer end of the skirtlike extension, said end portion of said plug member having a transverse bore therethrough arranged to be axially aligned with the bore through said skirtlike extension when said valve is in the closed position, said bore in said end portion of said plug member having at least a portion of its length with a diameter less than the diameter of the heads of said plunger lock, but at least as great as the diameter of the shank of the same whereby, when said valve is in said closed position, said plunger-type lock may be inserted from opposite directions into the aligned bores and locked with the heads abutting an area around the reduced portion of the bore in said end portion of said plug member to prevent axial movement of the lock member with respect to the valve plug member.

8. The combination as claimed in claim 7, including an axially extending noncircular socket in the end portion of said plug member intersecting the bore therethrough, a closure plug having at least an end portion of noncircular cross section complementary to said socket, said end portion of said closure plug having a transverse bore therethrough arranged to be aligned with the bore in the end portion of said plug member, the bore in said closure plug having a diameter sufficient to receive at least a portion of said plunger-type lock member.

9. A combination as claimed in claim 8 in which the end portion of said plug member terminates at a predetermined distance below the end portion of said skirtlike extension and in which said closure plug includes an enlarged head on its end portion, the head being received in said skirtlike extension and lying substantially flush with the end of the same.